United States Patent Office 3,193,550
Patented July 6, 1965

3,193,550
3,4-DIHYDRO DERIVATIVES OF CEPHALO-
SPORIN C AND PROCESS
Stanton A. Harris, Westfield, N.J., assignor to Merck &
Co., Inc., Rahway, N.J., a corporation of New Jersey
No Drawing. Filed Nov. 16, 1961, Ser. No. 152,907
4 Claims. (Cl. 260—243)

This invention relates to novel organic compounds having antibiotic activity and, more particularly, it is concerned with reduced derivatives of cephalosporin C and to processes for preparing these derivatives.

The antibiotic substance cephalosporin C and its preparation by fermentation of suitable species of cephalosporin has been described in the art. This antibiotic, which has been found to have the following structure

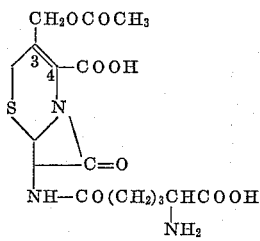

is active against both gram positive and gram negative bacteria.

Accordingly, it is an object of the present invention to provide novel derivatives of cephalosporin C having antibiotic activity.

Another object of this invention is to provide reduced derivatives of cephalosphorin C and processes for the preparation of these derivatives.

A more specific object of the present invention is to provide novel 3,4-dihydro derivatives of cephalosporin C and methods of making the same.

These and other objects will be made apparent from the following more detailed description of the invention, which follows.

In accordance with the present invention, there is provided a method for making 3,4-dihydro cephalosporin C derivatives from the corresponding unsaturated compound. In a typical illustration of the invention, a dialkyl ester of an N-acylated cephalosporin C is used as a starting material. Suitable alkyl groups include methyl, ethyl, propyl, substituted methyl and the like; the acyl groups include benzoyl, carbobenzoxy, phenylacetyl, hydantoins and the like. Those groups containing 1 to 12 carbon atoms are preferred.

The reduction is carried out catalytically with hydrogen over a noble metal catalyst. Suitable metals include platinum, palladium, rhodium, and ruthenium. Preferably the reduction is conducted at 25° to 100° C. at a pressure of from 1,000 to 30,000 lbs.

In a typical run, 1.1 grams of dimethyl N-benzoyl is prepared by alkylating the N-benzoyl derivative of cephalosporin C with diazomethane, cephalosporin C. This material in 30 ml. of glacial acetic acid is shaken with prereduced platinum from 1 gram of platinum oxide at 75° C. under 7,200 lbs. of hydrogen pressure for 48 hours. The platinum is then removed by centrifugation and the clear solution evaporated to dryness in a rotary flask evaporator at room temperature. The addition of a few drops of methanol then causes crystallization of a trace of the starting material. The remainder of the recovered material is the 3,4 dihydro-derivative of the cephalosporin C starting compound. The material is noncrystalline and is then converted to an amorphous powder by freeze drying in dioxane. The E% at 2600 A. varied from 22 to 44 without any change in the E% at 2260 A. The I.R. shows the presence of β-lactam and acetoxy groups. It has bands at 5.61, 5.72, 6.00, 6.50, 7.3, 8.25 and 9.70μ. The antibiotic activity is at 4 mg./mouse against Staph. aureus Smith.

While the invention has been described with reference to particular embodiments thereof, it will be understood that changes and modifications may be made which are within the skill of the art.

What is claimed is:
1. The 3,4-dihydro derivative of dimethyl-N-benzoyl cephalosporin C.
2. A method of forming 3,4-dihydrocephalosporin C derivatives which comprises catalytically reducing a member selected from the group consisting of dimethyl, diethyl and dipropyl esters of N-acryl cephalosporin C compounds, wherein the N-acyl substituent is selected from the group consisting of benzoyl, carbobenzoxy and phenyl acetyl in a solvent with hydrogen over a noble metal catalyst selected from the group consisting of platinum, palladium, rhodium and ruthenium at temperatures from 25° C. to 100° C. and at a pressure of from 1,000 to 30,000 lbs.
3. A method of forming 3,4-dihydrocephalosporin C derivatives which comprises catalytically reducing a member selected from the group consisting of dimethyl, diethyl and dipropyl esters of N-acyl cephalosphorin C compounds, wherein the N-acyl substituent is selected from the group consisting of benzoyl, carbobenzoxy and phenyl acetyl in glacial acetic acid with a noble metal catalyst selected from the group consisting of platinum, palladium, rhodium and ruthenium at temperatures from 25° C. to 100° C. and at a pressure of from 1,000 to 30,000 lbs.
4. A method of forming the 3,4-dihydrocephalosporin C derivative of the dimethyl ester of N-benzoyl cephalosporin C which comprises catalytically reducing dimethyl N-benzoyl cephalosporin C in glacial acetic acid with prereduced platinum at 75° under 7200 pounds of hydrogen pressure for 48 hours.

References Cited by the Examiner
UNITED STATES PATENTS
3,025,292    3/62    Jones et al. _____ 260—243

OTHER REFERENCES
Hackh's Chemical Dictionary, page 21, Second Edition (1937).
Jour. Amer. Med. Assoc., page 466, May 24, 1958.
Morton, The Chemistry of Heterocyclic Compounds, page VI of the preface (1946).
Wertheim, Textbook of Organic Chemistry, pages 763–764 (1945).

NICHOLAS S. RIZZO, Primary Examiner.